4 Sheets—Sheet 1.

J. H. ELWARD.
Machine for Thrashing Grain, &c.

No. 239,376.   Patented March 29, 1881.

Witnesses:
H. N. Low.
J. S. Barker

Inventor:
John H. Elward,
by H. H. Doubleday
atty

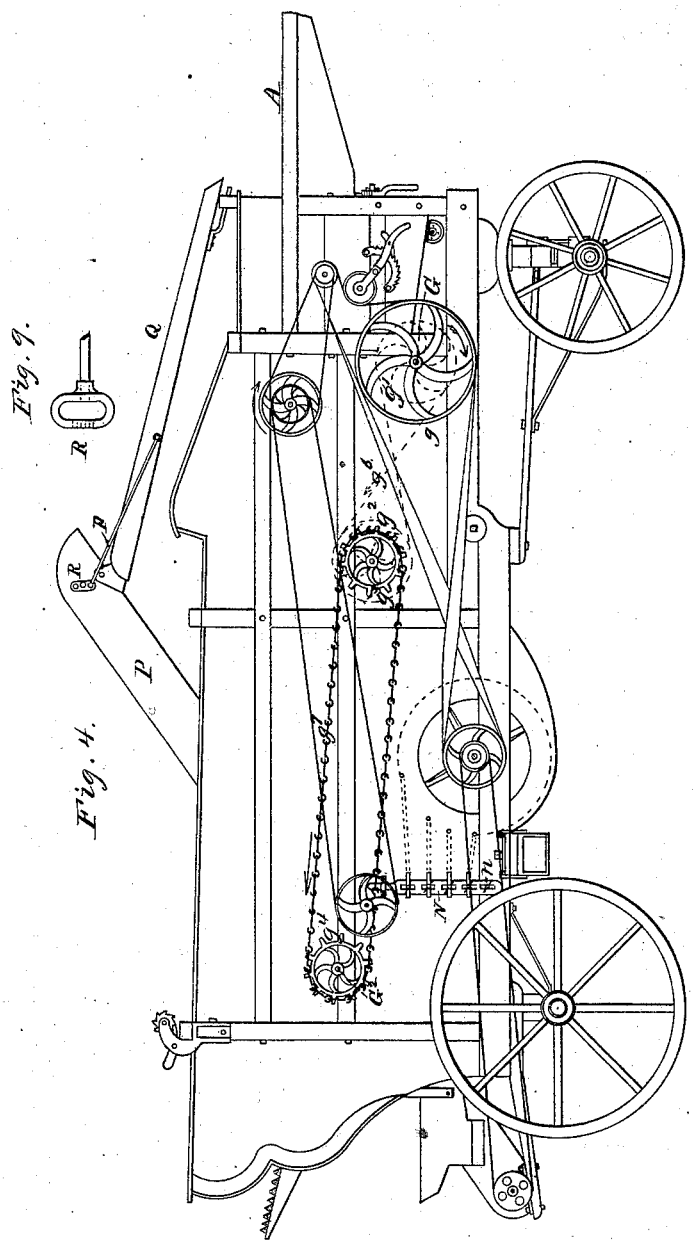

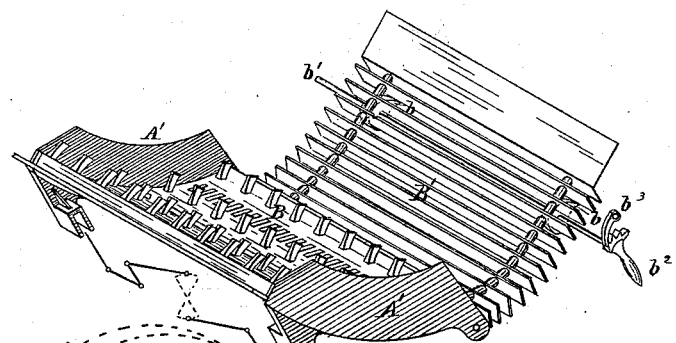
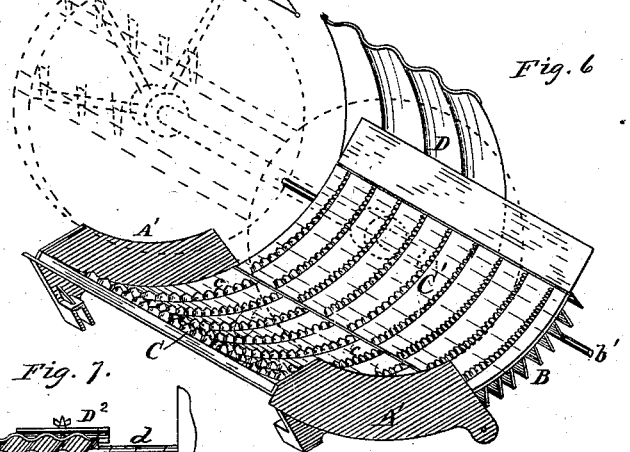
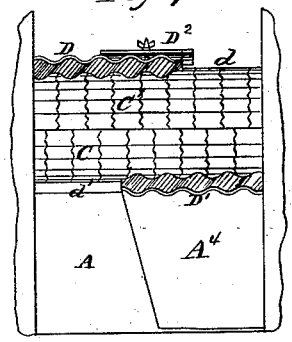

J. H. ELWARD.
Machine for Thrashing Grain, &c.

No. 239,376. Patented March 29, 1881.

4 Sheets—Sheet 4.

Witnesses:
H. N. Low.
J. S. Barker.

Inventor:
John H. Elward
by H. H. Doubleday
atty

UNITED STATES PATENT OFFICE.

JOHN H. ELWARD, OF STILLWATER, MINNESOTA.

MACHINE FOR THRASHING GRAIN, &c.

SPECIFICATION forming part of Letters Patent No. 239,376, dated March 29, 1881.

Application filed June 21, 1879.

*To all whom it may concern:*

Be it known that I, JOHN H. ELWARD, of the city of Stillwater, in the county of Washington and State of Minnesota, have invented certain new and useful Improvements in Machines for Thrashing Grain and Shucking or Hulling Grass-Seeds and Separating the Same from the Straw and Chaff; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 3:
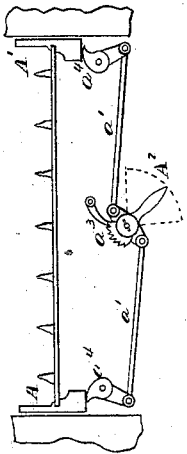
Figure 1:
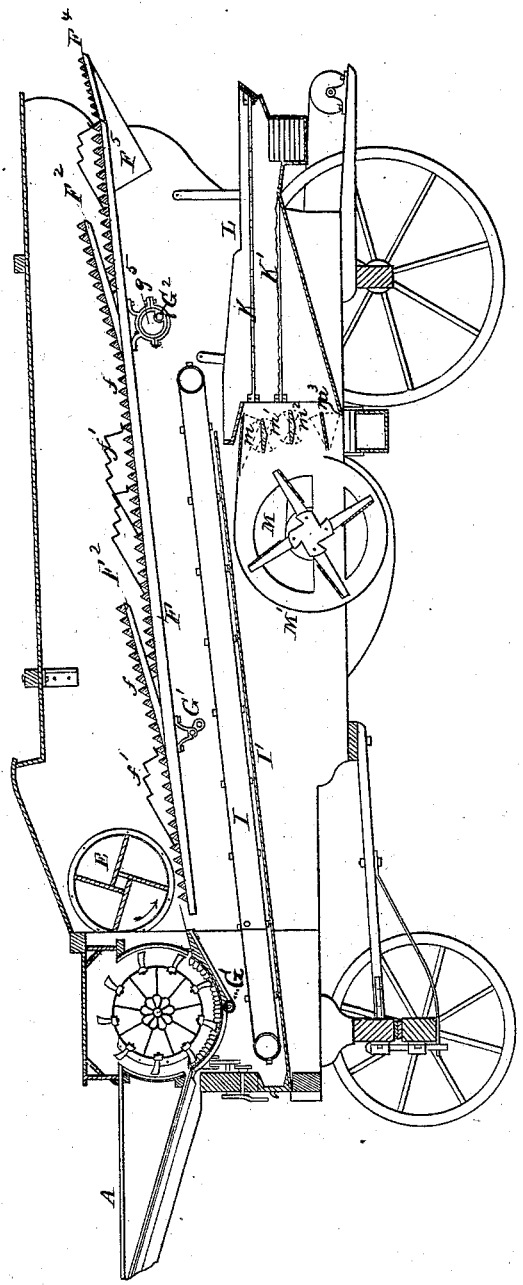
Figure 2:
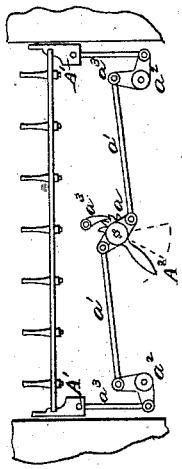
Figure 8:
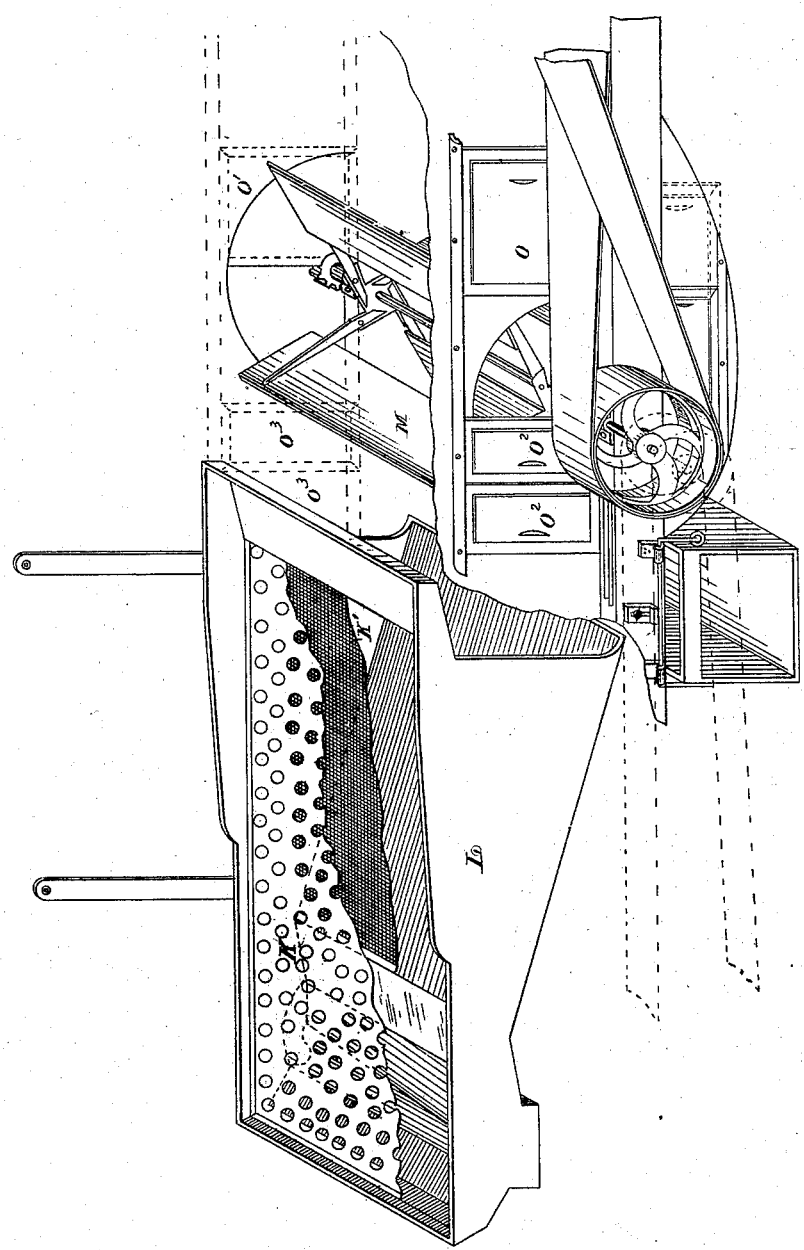

Figure 1 is a longitudinal vertical section of my improved thrashing-machine. Fig. 2 is a view of the mechanism for adjusting the position of the concave. Fig. 3 represents a modification of the devices shown in Fig. 2. Fig. 4 is a side elevation of the machine. Fig. 5 is a perspective view of an ordinary concave and grate. Fig. 6 is a perspective view, showing my improved concave. Fig. 7 is a top view of the devices shown in Fig. 6. Fig. 8 is a perspective view of the fan and shoe, parts of the casing being broken away. Fig. 9 is a side view of the elevator-shaft crank.

In the drawings, A represents the chute through which the grain or grass is fed to the machine.

A' A' are the cheek-pieces, to which the concave is attached.

The position of the parts A' A' and of the concave can be adjusted by means of the lever A², pivoted to the front end of the machine and carrying a cross-head, $a$, to which links $a'$ $a'$ are pivoted. These links are also pivoted to bell-crank levers $a^2$ $a^2$, which are connected with the cheek-pieces A' A' by means of links $a^3$.

A pawl, A³, engages with the lever A² or the cross-head $a$, and holds the adjusting devices in any desired position.

Instead of the bell-crank levers $a^2$ $a^2$ and the links $a^3$ $a^3$, a lever, $a^4$, may be employed, which is shown in Fig. 3 to be pivoted to the frame, and to be provided with a cam at its upper end, adapted to engage with the under side of the concave or pieces A' A'.

In a patent previously granted to me, No. 187,607, dated February 20, 1877, were shown devices for adjusting the front edge of the concave, said devices consisting of a crank-head, toggle-levers, and links attached to said head and attached to each of the levers between its fulcrum and the concave. I have found that under many circumstances it is desirable to have a much more delicate adjustment than can be thereby attained. By the devices herein shown this more delicate adjustment is possible, inasmuch as they permit a more limited movement of the concave relative to the movement of the crank-head, it being possible to place in a small place at the front end of the machine these devices, whereby with the same or a greater movement of the handle a less movement of the concave results, thus providing a more delicate adjustment, a very delicate adjustment being necessary in thrashing the smaller seeds especially.

In Fig. 5, B represents an ordinary concave, with the usual teeth, and having the grating B' behind it, the grating being adjustable by means of the cams $b$ $b$, attached to a shaft, $b'$. The shaft is operated by a ratcheted lever, $b^2$, with which a pawl, $b^3$, is arranged to engage; but the concaves, which are constructed with the teeth and otherwise as shown in said figure, are not as efficient as is desirable in thrashing grasses and grains having small seeds. I have succeeded in obviating the difficulties thus met with by constructing a concave substantially as shown in Fig. 6, adapted to be inserted in place of the ordinary concave after removing the latter from its supports. This concave has instead of the ordinary teeth series of ribs projecting from the upper face, serrated upon their upper edges and corrugated upon both sides, and operating very efficiently to rub off the hulls or shucks of the smaller seeds.

The concave is shown at C, Fig. 6, and the serrated and corrugated ribs at $c$. Behind this concave C there is placed a secondary concave, C', placed on the top of and supported by the grate B'. It, too, is provided with ribs similar to those described above.

It will be seen that the front concave, C, and the rear or secondary concaves, C', when placed as shown, form a wall below the cylinder both in the rear and in front thereof, compelling the thrashed material to pass through the escape-opening, to be hereinafter described.

D is a plate of sheet metal, curved so as to be concave, and situated behind the thrashing-cylinder, with its lower edge in proximity to the upper edge of the concave C', and extending upward sufficiently far to prevent the material which is being thrashed from passing over it. This plate is provided with spiral or screw-thread corrugations running from the bottom to the top. It does not extend the full length of the concave, but leaves at one end an open space, $d$, Fig. 7, or passage-way from the cylinder-chamber to the separating-table.

Use has been made of plates in rear of thrashing-cylinders, and provided with spirally-arranged wings detached from each other, and extending but a portion of the distance from the top to the bottom of the plate. These wings have been found impracticable, as the edges of them tend to catch and be clogged with the straw and render the devices useless. Moreover, the construction of such plates is expensive and the parts are fragile. These difficulties I have obviated by constructing the returning-plates, as shown—that is, with spiral corrugations extending continuously from the top to the bottom of the plate, and formed by swaging or bending the plate itself to form the corrugations.

In front of the cylinder there is placed another concave spirally-corrugated plate, D'. It is situated at the opening or mouth which is ordinarily provided for introducing grain to the cylinder, and extends only a part of the way across, leaving an opening at $d'$ (diagonally opposite to the opening at $d$) for feeding the machine. It may be supported in any convenient or desired way, though I prefer to do so by means of a plate or block, $A^4$, secured to the chute A.

$D^2$ represents a sliding plate arranged to adjust the size of the opening $d$, and to be held in any desired position by set-screws.

The grasses that are to be thrashed, shucked, or hulled are fed to the cylinder and concaves through the opening $d'$ in the chute A. They are drawn under the cylinder where they are thrashed and rubbed between the cylinder-teeth and the serrated and corrugated ribs $c$ of the concave until they reach the rear side of the cylinder, where they strike against the corrugated plate D'. This plate throws the grasses back over the top of the cylinder, and, moreover, on account of the spiral or screw-thread corrugations, it (said plate) causes the material to return in vertical planes other than those in which it moved when going under the cylinder—that is to say, it moves it endwise along the cylinder toward the opening $d$ at the same time that it throws it back to the front of the cylinder. When said materials return to the front of the cylinder they strike against the plate D', which in turn guides them down under the cylinder again, until finally they are forced out of the cylinder-chamber through opening $d$ to the separating-table. After it escapes it passes under the beater E, constructed and arranged as shown, to throw the straw, chaff, and grass or grain downward and backward upon the table F.

The separating-table is constructed with slats $f\ f$, triangular in cross-section, which insure that the grain or seed shall fall through the table.

I have found the wires which are used with separating-tables to be very defective as ordinarily constructed, and I have shown at $f'$ in Fig. 1 an improved wire, which I have found very efficient and durable. The wires are bent so as to form several angular projections or steps, and at their outer or free ends are bent down so as to rest upon the triangular slats, being provided with feet for their support.

Heretofore wires have been used without any support for their outer ends, and the straw causes them to spring up and down in such manner as to break off and thus be rendered useless; but by my construction this breakage is avoided, as the springing is prevented, and the work of the wire is effectively performed.

The separating-table is provided also with upwardly-inclined supplemental tables or stair-like elevations $F^2$, which are constructed of stringers (having their rear ends elevated) and triangular slats. When the straw, stalks, chaff, &c., reach the top of these elevations $F^2$, they are suddenly thrown down upon the table F, and thus any bunches of straw that may be formed are torn to pieces and separated, and the seeds are entirely separated from the other material.

The table F is operated as follows: G is a shaft running through the machine near the front end. It carries at one end a pulley, $g$, and at the opposite end a pulley, $g'$, (dotted lines, Fig. 4.)

G' is another shaft, situated beneath the front end of the separating-table F, carrying a pulley, $g^2$, (dotted lines, Fig. 4,) and a sprocket-wheel or pulley, $g^3$. Shaft G' is bent inside of the casing to form a crank, as shown in Fig. 1.

$G^2$ represents a shaft near the rear end of the table F, having outside the casing a sprocket-wheel, $g^4$, and inside the casing eccentrics or cranks $g^5$.

Pulley $g$ is driven by a band from the cylinder-shaft.

Pulleys $g'$ and $g^2$ are connected by a band, $g^6$, (dotted lines, Fig. 4.)

The wheels $g^3$ and $g^4$ are connected by a sprocket chain or belt, $g^7$, instead of the pitman or link ordinarily employed.

By thus connecting and driving the crank or eccentric shaft they are moved simultaneously, and a better motion is obtained than when driven by the devices now used.

The inclines or inclined elevations above described serve as temporary stops to retard the straw for a short time and insure a better separation. By mounting the table (especially the rear end) on continuously-rotating devices, such as a cam or cranks, the inclines operate much more efficiently than when the table is operated by reciprocating devices, as the straw is carried upward as well as longitudinally forward, the rotary devices thus assisting the inclines in producing the shocks or falls necessary to properly separate the grain. The bent wires also operate to produce this elevating and dropping of the straw, and it will be readily seen that instead of the wires and wooden stringers above described, other devices will suggest themselves—as thin blades of wood or sheet metal.

At or near the rear end of the separating-table there is a detachable supplemental table, F⁴, extending beyond the end of the machine, which is used when the grains are wet or difficult to thrash. It is provided with a chute-board or returning-spout, F⁵, for the purpose of returning to the sieves any grain that may be shaken out on this portion of the table.

I is a skeleton-rake, acting on the table I' to carry the grain to the sieves K K', supported and oscillated in the shoe L.

M is the fan, mounted within a casing, M', the opening from which is provided with four blast-deflectors, $m\ m'\ m^2\ m^3$. By means of these deflectors three different currents of air can be produced at the same time.

The shafts of the deflectors project through the casing of the machine and through a bar, N, which is provided with slots for their reception. Each shaft has a thumb-screw, so that the deflectors can be adjusted vertically independently of each other, and be secured in any desired position. The bar N is arranged to slide vertically and carry all of the deflectors together up or down, and it is provided with a thumb-screw, $n$, or other suitable device, to hold it after it has been adjusted. There may be a bar, N, on each side of the machine.

The fan-case is at each end provided with openings and with adjustable doors for admitting and regulating the air.

The front portion of the casing has at each end a sliding door, O O', and the other portion has two sliding doors, $O^2\ O^2\ O^3\ O^3$, arranged so that one can slide over the other at the rear of the inlet when the room is limited, and thus render possible a much nicer adjustment.

If the door O on one side and the doors $O^3\ O^3$ be opened, and the doors O' and $O^2\ O^2$ be closed, it will be seen that the air which enters at the doors $O^3\ O^3$ will be immediately forced out of the fan-casing, as these doors are situated nearest to the exit. This produces a strong current of air on the side where the rear doors, $O^3\ O^3$, are open, and also a partial vacuum, which draws the air from the other side, where the inlet O is much farther removed from the exit. The result is, that most of the air taken in on both sides of the machine will be forced out on one side—viz., the side where the rear doors are open.

If the doors O and $O^3\ O^3$ be closed and the opposite doors, O' and $O^2$, be opened, the air-current will be reversed. The object of this is to enable the operator to counteract a current of winds which may be blowing against the one or the other side of the machine, and which if not counteracted often renders it impossible to properly clean the grain.

P represents the tailings-elevator, and Q the delivery-spout of the elevator. They are connected by a link, $p$, attached to a crank-head, R, carried by the upper shaft or reel of the elevator. This crank-head has a series of apertures, as shown in Figs. 4 and 9, for attaching the link so as to adjust the throw of the spout Q.

What I claim is—

1. In a machine for thrashing grass-seeds, the combination, with the front concave, C, having the ribs $c$, serrated upon their upper edges and corrugated upon their vertical sides, of the removable rear concave, C', having similar ribs, said concaves being arranged to form a tight wall below the cylinder, both in rear and in front thereof, and substantially concentric therewith.

2. The combination, with the permanent grating B', formed with contiguous transverse bars, of the front removable concave, C, and the rear removable concave, C', arranged to be supported concentrically to the cylinder upon said grating, and to close the passages between said bars.

3. The combination of the main separating-table F and the supplemental tables F², situated obliquely to the main table, and constructed with transverse slats, as set forth.

4. The combination, with the separating-table F, of the wires $f'$, constructed substantially as set forth, and arranged to have their ends rest upon the table, as set forth.

5. In combination with the fan, the doors O O', arranged on one side of the fan, and the doors $O^2\ O^3$ on the other side, when constructed and operated substantially as set forth.

6. In a grain-separator, a separating-table constructed with a main table, F, lying in a continuous plane, and with inclines projecting upwardly from the main table and adapted to elevate and temporarily retard the straw, in combination with a continuously-rotating shaft and eccentrically-revolving devices which connect the shaft to the table, as set forth.

In testimony that I claim the foregoing as my own I affix my signature in presence of two witnesses.

JOHN H. ELWARD.

Witnesses:
W. F. BARSTOW,
H. J. CHAMBERS.